May 24, 1955　　　A. W. KRAUSE　　　2,709,128

PACKING OR FILLING ELEMENT

Filed Oct. 9, 1952

INVENTOR.
ARTHUR W. KRAUSE
BY
ATTORNEYS

United States Patent Office 2,709,128
Patented May 24, 1955

2,709,128

PACKING OR FILLING ELEMENT

Arthur W. Krause, Massapequa, N. Y., assignor to The Gas Machinery Company, Cleveland, Ohio, a corporation of Ohio Application October 9, 1952, Serial No. 313,870

9 Claims. (Cl. 23—288)

The present invention relates to a special class of packings or filling bodies which serve to break up, deflect or otherwise intermingle a stream of fluids. In passing fluids through a tube or conduit, a certain portion of the fluids will pass through the center of the tube and will be affected or treated to a lesser degree than the fluids near the circumferential wall of the tube. This central portion of the fluids is frequently called the "core." Thus, in order to prevent the core of the fluids from passing through the tubes in a relatively untreated condition, it is desirable to break up the core by dividing the stream and/or causing turbulence thereof. For these reasons, packing elements are frequently termed "corebreakers."

More particularly, the present invention relates to corebreakers having a particular shape by which various functional advantages are obtained. In addition, the present invention relates to corebreakers which may be impregnated with a catalytic material, if desired.

Many forms and kinds of filling bodies or corebreakers are known for increasing contact between two fluids as they are passed through towers, columns, chambers and the like. As is known, a high degree of contact between the fluids is usually desirable and necessary in distillation columns, reaction towers, scrubbing columns, absorbers and the like. To obtain the desired contact, packings such as the well-known Raschig rings are placed in the column or tower so as to break up, deflect and intermix the two fluids. The fluids, of course, may consist of different chemical components or they may consist of different phases of a single component or they may consist of different proportions of substantially the same two chemical components, as in azeotropic distillation.

In the past there has been a tendency to use those packings which will provide the greatest degree of turbulence and intermingling so as to obtain the most efficient operation. However, as the turbulence increases, the pressure drop from entrance to exit likewise increases and frequently reaches a point where the advantages of increased turbulence are more than offset by the increase in pressure drop. It is, therefore, highly desirable to provide corebreakers which will provide efficient operation without an excessive pressure drop.

In catalytic operations it has generally been considered advantageous to provide a given mass of catalytic material with as great a surface area as possible for contact by the reactants. When a stationary bed of catalytic particles, as distinguished from the fluidized bed of pulverized material, is used, the catalyst particles have been provided with as great a surface area as possible and the particles have been arranged at random and haphazardly so as to cause a high degree of turbulence whereby the maximum contact between reactants and catalyst is obtained.

It has now been found that when catalytic corebreakers according to the present invention are employed the available surface area of the catalyst bed may be reduced, thus reducing the pressure drop, without seriously altering the catalytic effect. Although the catalytic efficiency may be reduced somewhat in terms of reaction products, the overall efficiency of the operation is increased due largely to the decreased pressure drop and consequent increased flow per unit of time.

The corebreakers of the present invention are particularly useful when employed in tubes which are heated externally, thus supplying radiant heat to the interior of the tube. Due to the configuration of the present corebreakers, the fluids passing therearound are subjected to radiant heat transmitted directly from the walls of the tube and from the surface of the corebreaker itself and not by heat which has been re-radiated through the walls of the corebreaker. When using randomly placed Raschig rings or uniformly arranged rings to form a plurality of tubular passages within the tube, the fluids passing through any particular ring or tubular passage are subjected only to heat which has been re-radiated through the walls of the Raschig ring itself, thus reducing efficiency of heat transfer. It is, therefore, an object of the present invention to provide a novel corebreaker.

A further object is to provide a corebreaker which, when properly arranged in a tubular element, will reduce the pressure drop from inlet to outlet as compared to previously known packings or catalyst carriers.

Another object of the invention is to provide a novel catalytic corebreaker.

Still another object of the invention is to provide a corebreaker which reduces pressure drop with a disproportionate decrease in efficiency of operation whereby an overall increase in economy is obtained.

Other advantages will appear from the detailed description of the invention which follows. The invention is illustrated in the accompanying drawings in which Figure 1 is a perspective view of a corebreaker according to a preferred embodiment of the present invention.

Figure 4:
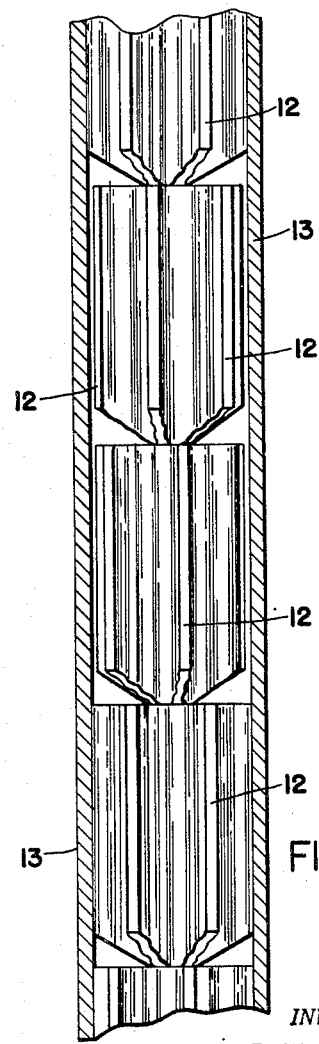
Figure 4 is a view showing one type of arrangement of a plurality of corebreakers in a tube.

As shown in the drawings, the corebreaker comprises a central longitudinal hub 11 having vanes 12 extending outwardly therefrom, the general plane of each vane passing through the axis of the hub. When the corebreaker is disposed within a tube 13 during use, as shown in Figure 4, the longitudinal axes of the hubs are substantially coaxial with the axis of the tube. The number of vanes may vary from three up to nine or more, although six has been found to be a suitable number.

Figure 1:
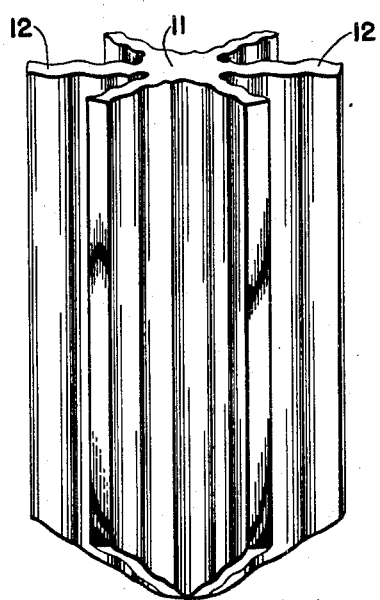
Figure 3:
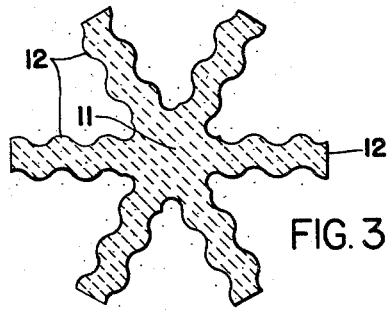
Figure 3 is a horizontal cross sectional view along lines 3—3 of the corebreaker shown in Figure 2.

Each of the vanes has opposed corrugated surfaces so that, in horizontal cross section, they present a sinuous configuration and have a sinusoidal character, as shown in Figure 3. The opposed corrugations of the vanes are arranged so that the vane in any cross sectional plane has substantially uniform thickness. The corrugations extend in a direction parallel to the longitudinal axis of the hub 11.

By virtue of the corrugations, the surface of each vane available for contact with the fluids is greater than if the vanes had smooth plane surfaces. At the same time, the resistance to flow is not increased since the corrugations are substantially parallel to the flow of fluids through the tube. In addition, the corrugations are of such a depth that any point on the surface of the vanes may be connected by an uninterrupted straight line to a point on a circumference bounding a horizontal cross-section of the packing element. In other words, none of the corrugations are so deep as to form pockets in which the fluids would be shielded from direct radiation from the interior wall of the tube. In this manner, the overall efficiency of the corebreakers is at a maximum since the surface available for contact with the fluids, particularly when the corebreaker includes catalytic material, is at a maximum and all of the fluids are directly exposed to the radiant heat from the walls of the tube, without increasing the pressure drop through the tube.

Figure 2:
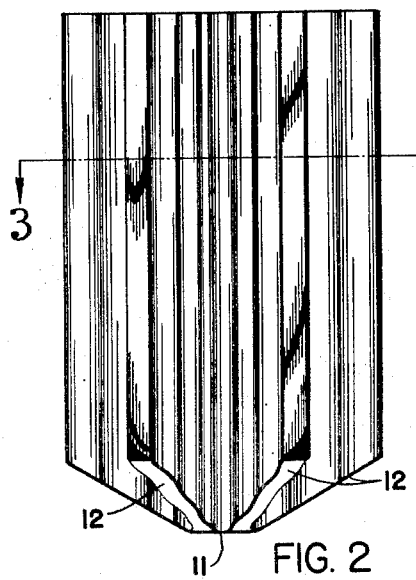
Figure 2 is an elevational view of the corebreaker shown in Figure 1.

As shown in the drawings, one end of the corebreaker may have a somewhat pointed configuration by providing the vanes with terminal edges which form an angle of less than 90° with the longitudinal axis of the hub. As shown in Figure 2, the angle between the terminal edge and the hub is about 60°.

When a series of corebreakers are placed in a tubular element in superimposed relation, a space is provided between each corebreaker and the adjacent one to permit the fluids to intermix when passing from one corebreaker to the next. In order to increase the intermixing of the fluids, the corebreakers may be arranged as shown in Figure 4 in which each corebreaker is turned through an angle with respect to adjacent corebreakers so that the passages, instead of being co-extensive, would be staggered or generally spiral.

Furthermore, in order to increase turbulence with a minimum increase in pressure drop, the thickness of the vanes in a direction parallel to the hub of the corebreaker, i. e., a vertical cross-section of a vane, may be progressively increased or decreased from top to bottom. This would result in the passages of a corebreaker becoming progressively smaller or larger in cross section. For example, a vane may have a thickness of ⅜" at the top and a ¼" thickness at the bottom where the overall height of the corebreaker is about six inches.

As stated hereinbefore, the corebreakers can be impregnated with a catalytic material. Generally, the corebreaker is made of a refractory material, such as aluminum oxide or the like, and is of a porous character. For example, such a corebreaker may be soaked in a solution of nickel nitrate, or other solution so as to thoroughly impregnate the corebreaker. After impregnation, the corebreaker is dried and then baked at a temperature of about 1000° F. so as to convert the nitrate to the catalytically active nickel oxide. Obviously, other conventional methods of impregnating porous refractory materials may be used and, if desired, the catalyst may be deposited in or on the corebreaker by other methods. Likewise, other catalytic materials may be used depending on their intended use.

The corebreakers of the present invention whether impregnated or coated with catalytic material or not, may also be used as heat transfer elements, i. e. to recover or absorb heat from hot fluids and to release or give up heat to cool fluids. Thus, the corebreakers may be used as heat storage elements in pyrolytic processes such as the thermal treatment of hydrocarbons. In such cases a plurality of columns of corebreakers may be arranged in a chamber thus providing a plurality of passages therethrough.

Although the invention has been described with reference to the modification shown in the attached drawing, it will be understood that other modifications which would occur to one skilled in the art are not excluded. The scope of the present invention is defined by the following claims.

What is claimed is:
1. A packing element for dividing a confined stream of fluids comprising a longitudinal hub and a plurality of vanes extending outwardly from said hub, said vanes lying substantially in planes extending through the axis of said hub thus forming a plurality of passages between the vanes, which passages are substantially parallel to the axis of the hub, each of said vanes having corrugated surfaces, said corrugations extending substantially parallel to the axis of the hub and being of such depth that any point on the surface of said vanes may be connected by an uninterrupted straight line to a point on a circumference bounding a horizontal cross-section of said packing element.

2. A packing element as claimed in claim 1 wherein the thickness of said vanes decreases from one end to the other end in a direction parallel to the axis of the hub.

3. A packing element as claimed in claim 1 wherein the corrugations on opposing sides of said vanes are substantially parallel whereby the thicknesses of said vanes in any cross sectional plane are substantially uniform.

4. A packing element as claimed in claim 1 wherein at one end of said element, said vanes terminate with edges forming an angle of less than 90° with the axis of the hub.

5. A packing element as claimed in claim 4 wherein the angle is about 60°.

6. A packing element as claimed in claim 1 wherein the element comprises a porous material which has been impregnated with a catalytic material.

7. A device for treatment of fluids comprising an elongated tubular element and a series of packing elements disposed in superimposed relation therein, said elements comprising a longitudinal hub and a plurality of vanes extending outwardly from said hub, said vanes lying substantially in planes extending through the axis of said hub, each of said vanes having corrugated surfaces, said corrugations extending substantially parallel to the axis of the hub and being of such depth that any point on the surface of said vanes may be connected by an uninterrupted straight line to a point on the inner surface of said tubular element.

8. A device as claimed in claim 7 wherein the elements are arranged so that the vanes thereof and the passages therebetween are substantially co-extensive.

9. A device as claimed in claim 7 wherein at least one element is turned through a horizontal angle with respect to adjacent elements whereby the passages are at least partially non-co-extensive.

References Cited in the file of this patent

UNITED STATES PATENTS

| Number | Name | Date |
|---|---|---|
| 432,842 | Sherman | July 22, 1890 |
| 1,173,187 | Hechenbleikner | Feb. 29, 1916 |
| 1,480,463 | Petzel | Jan. 8, 1924 |
| 1,676,451 | Lilge | July 10, 1928 |
| 2,042,451 | Bond et al. | June 2, 1936 |
| 2,212,932 | Fairlie | Aug. 27, 1940 |
| 2,387,026 | Huntington | Oct. 16, 1945 |

FOREIGN PATENTS

| Number | Country | Date |
|---|---|---|
| 283,869 | Great Britain | Nov. 5, 1927 |
| 486,248 | Great Britain | June 1, 1938 |